US008194684B2

(12) United States Patent
Uematsu (10) Patent No.: US 8,194,684 B2
(45) Date of Patent: Jun. 5, 2012

(54) NETWORK APPARATUS, REDUNDANT NETWORK METHOD, AND COMPUTER PRODUCT

(75) Inventor: Kumiko Uematsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 11/987,113

(22) Filed: Nov. 27, 2007

(65) Prior Publication Data
US 2008/0175142 A1 Jul. 24, 2008

(30) Foreign Application Priority Data

Jan. 19, 2007 (JP) ................................. 2007-010604

(51) Int. Cl.
*H04L 12/28* (2006.01)
(52) U.S. Cl. .................... 370/401; 370/395.51; 370/398; 370/422; 370/419
(58) Field of Classification Search .................. 370/228, 370/372, 360, 387, 388, 398, 419, 422, 395.51, 370/401, 420, 356
See application file for complete search history.

(56) References Cited

U.S. PATENT DOCUMENTS

| | | | | |
|---|---|---|---|---|
| 5,959,972 | A * | 9/1999 | Hamami | 370/228 |
| 6,272,129 | B1 * | 8/2001 | Dynarski et al. | 370/356 |
| 6,891,840 | B2 * | 5/2005 | Okada | 370/401 |
| 7,031,324 | B1 * | 4/2006 | Goody | 370/401 |
| 7,085,224 | B1 * | 8/2006 | Oran | 370/216 |
| 7,359,389 | B2 * | 4/2008 | Kusayanagi | 370/401 |
| 7,394,758 | B2 * | 7/2008 | Gonda | 370/218 |
| 7,599,372 | B2 * | 10/2009 | Kwak et al. | 370/395.1 |
| 7,653,526 | B1 * | 1/2010 | Ryle et al. | 703/23 |
| 2001/0029546 | A1 * | 10/2001 | Motoyama | 709/235 |
| 2002/0176426 | A1 * | 11/2002 | Asano et al. | 370/401 |
| 2002/0176450 | A1 * | 11/2002 | Kong et al. | 370/539 |
| 2003/0076857 | A1 | 4/2003 | Morita et al. | |
| 2006/0023630 | A1 * | 2/2006 | Akiyama et al. | 370/235 |
| 2006/0182036 | A1 * | 8/2006 | Sasagawa et al. | 370/242 |
| 2006/0198356 | A1 * | 9/2006 | Mayernick | 370/351 |
| 2006/0274782 | A1 | 12/2006 | Rikitake | |
| 2007/0041321 | A1 * | 2/2007 | Sasaki et al. | 370/235 |
| 2007/0076734 | A1 * | 4/2007 | Muniyappa et al. | 370/412 |
| 2008/0056294 | A1 * | 3/2008 | Maeda et al. | 370/437 |
| 2008/0089226 | A1 | 4/2008 | Konuma et al. | |
| 2008/0089236 | A1 * | 4/2008 | Kotrla et al. | 370/242 |
| 2009/0046575 | A1 * | 2/2009 | Miyazaki | 370/216 |

FOREIGN PATENT DOCUMENTS

| | | |
|---|---|---|
| JP | 2003-134074 | 5/2003 |
| JP | 2004-349764 | 12/2004 |
| WO | 2005/079015 | 8/2005 |
| WO | 2006/114809 A1 | 11/2006 |

OTHER PUBLICATIONS

Japanese Office Action issued Mar. 15, 2011 in corresponding Japanese Patent Application 2007-010604.

* cited by examiner

*Primary Examiner* — Ricky Ngo
*Assistant Examiner* — Dewanda Samuel
(74) *Attorney, Agent, or Firm* — Staas & Halsey LLP (57) ABSTRACT

A network apparatus for a wide area network (WAN) includes a plurality of ports through which a local area network (LAN) and the WAN are connected; an active-port selecting unit that selects an active port from among the ports, and identifies a port other than the active port as a standby port; and a notifying unit that notifies an interface device for the LAN via the standby port that a line connected to the standby port is in a standby mode.

11 Claims, 9 Drawing Sheets

NETWORK APPARATUS, REDUNDANT NETWORK METHOD, AND COMPUTER PRODUCT

BACKGROUND OF THE INVENTION

1. Field of the Invention

The present invention relates to a network apparatus that functions as an interface on the side of a WAN (wide area network) and links a LAN (local area network) and the WAN by a plurality of lines through a plurality of ports.

2. Description of the Related Art

A technology known as SONET/SDH (Synchronous optical network/synchronous digital hierarchy) has been conventionally used to create WAN (wide area network) by connecting LAN (local area networks) formed from user terminals. SONET/SDH enables high-speed data transfers over optical communication lines, accounting for reliable WANs due to redundancy of transmission channels.

In contrast to the high reliability of SONET/SDH, Ethernet (registered trademark) used in LANs has a relatively low reliability. Thus, when Ethernet (registered trademark) and SONET/SDH are connected, communication failure could occur due to malfunctioning Ethernet (registered trademark).

To address the problem mentioned above, as described in International Publication No. WO/2005/079015, a linking device on the Ethernet (registered trademark) network side in the form of an Ethernet (registered trademark) device and a linking device on the SONET/SDH network side in the form of an SDH device are linked by an active line and a standby line redundantly, wherein when communication failure is detected in the active line between the Ethernet (registered trademark) device and the SDH device, the SDH device resumes communication by switching to the standby line.

A technology known as link aggregation is generally used for multilinking the Ethernet (registered trademark) device and the SDH device. Link aggregation allows multiple physical lines to be treated as a single logical line, thus increasing the effective bandwidth of communication channels. In link aggregation, packet data should be transmitted from the Ethernet (registered trademark) device to the SDH device without specifying any line. Thus, merely switching the lines from active to standby on the SDH device side can result in loss of packet data transmitted from the Ethernet (registered trademark) device to the SDH device.

Thus, in the conventional technology represented by the technology disclosed in International Publication No. WO/2005/079015, packet loss occurs due to switching of the lines from active to standby on the SDH device side.

SUMMARY OF THE INVENTION

It is an object of the present invention to at least partially solve the problems in the conventional technology.

According to an aspect of the present invention, a network apparatus for a wide area network (WAN) includes a plurality of ports through which a local area network (LAN) and the WAN are connected; an active-port selecting unit that selects an active port from among the ports, and identifies a port other than the active port as a standby port; and a notifying unit that notifies an interface device for the LAN via the standby port that a line connected to the standby port is in a standby mode.

According to another aspect of the present invention, a redundant network method for connecting a local area network (LAN) and a wide area network (WAN) through a plurality of ports, includes selecting an active port from among the ports; identifying a port other than the active port as a standby port; and notifying an interface device for the LAN via the standby port that a line connected to the standby port is in a standby mode.

According to still another aspect of the present invention, a computer-readable recording medium stores therein a computer program that implements the above method on a controller of an interface device for the WAN.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the network apparatus, the redundant network method, and the redundant network program according to the present invention are described below with reference to the accompanying drawings. In the embodiments, the present invention is applied to a multi-service provisioning platform (MSPP) device provided as an interface on a synchronous optical network/synchronous digital hierarchy (SONET/SDH) side. The SONET network represents WAN. The MSPP device can flexibly provide a multitude of services such as voice communication, voice distribution, and graphics distribution and performs 1+1 switching. In the description below, the WAN is represented by a SONET network. However, the WAN can also be an SDH network.

It is supposed that an L2/L3 switch device (hereinafter, "L2/S3 switch") equipped with a link aggregation function and connected to the MSPP device serves as an interface on the LAN side.

The MSPP device described in a first and a second embodiments includes as physical ports for connecting to the L2/L3 switch an active (WK, short for working) Eth (Ethernet (registered trademark) interface unit) and a standby (PT, short for protection) Eth, referred to hereinafter as Eth(WK) and Eth (PT), respectively. The 1+1 switching control mentioned earlier refers to a control over switching between Eth(WK) and Eth(PT).

The MSPP device receives frames (data) from the SONET network (WAN) via an O/E (SONET/Ethernet (registered trademark) interface) of an OCn (optical communication channel n, where n corresponds to each value of 3, 12, 48, and 192, and to line speeds of 150 Mbps, 600 Mbps, 2.4 Gbps, and 10 Gbps, respectively) and passes the frames on to either the Eth(WK) or the Eth(PT), whichever is active (ACT), by a time slot interchange (STS TSI) function. The MSPP device also transmits the frames passed on to either the Eth(WK) or the Eth(PT), whichever is active, by the L2/L3 switch, to the SONET network (WAN) via an E/O (Ethernet (registered trademark)/SONET interface) of the OCn.

Figure 1:
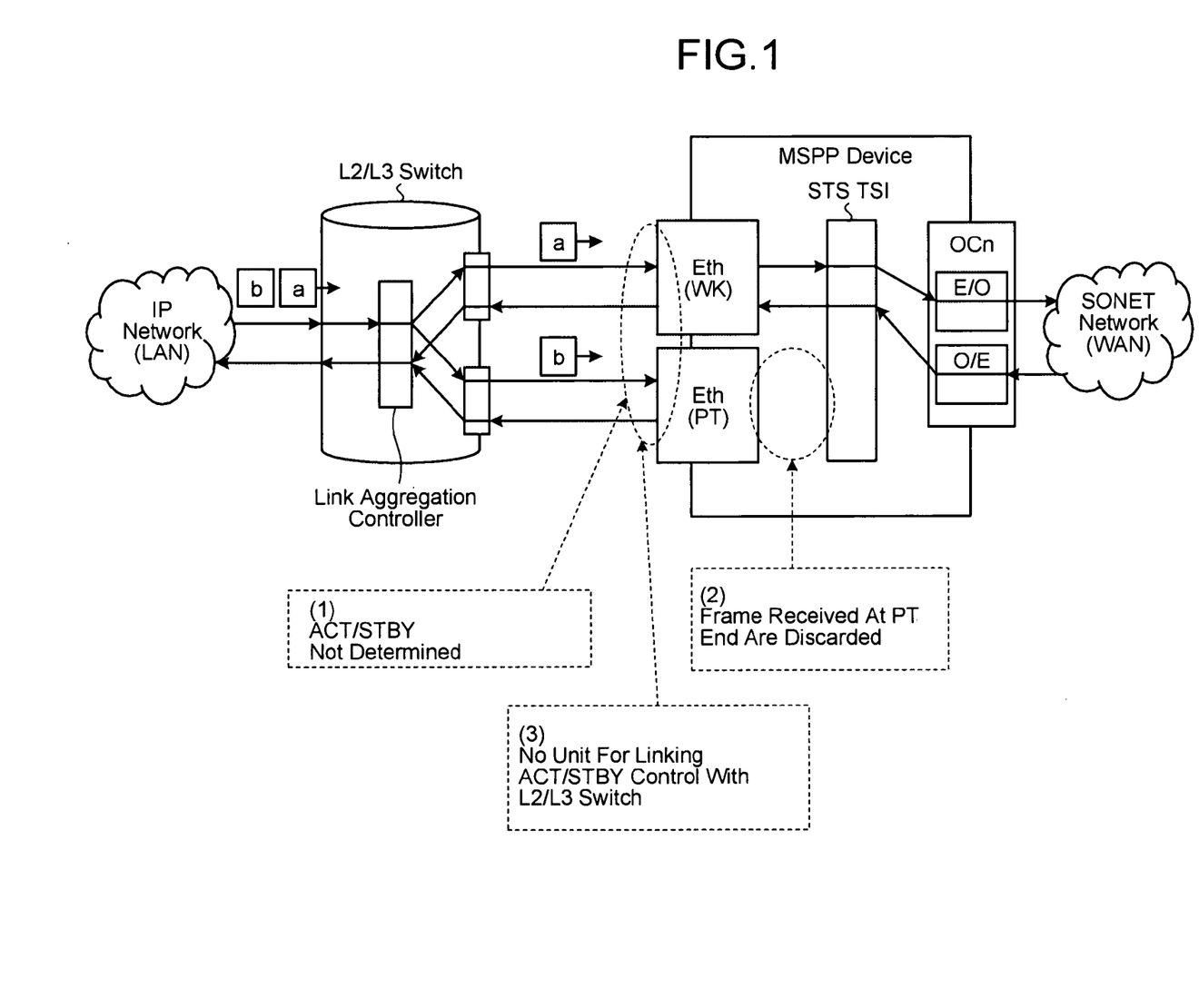
FIG. 1 is a schematic for explaining the problem that can arise between an L2/L3 switch equipped with a link aggregation function and an MSPP device.

Prior to explaining the first and second embodiments, the problem that can arise between the L2/L3 switch that is equipped with link aggregation function and the MSPP device is described. FIG. 1 is a schematic for explaining the problem that can arise between the L2/L3 switch equipped with the link aggregation function and the MSPP device.

The frames received by the MSPP device from the SONET network (WAN) via the O/E are transmitted to the L2/L3 switch via the Eth(WK) by STS TSI function. The link aggregation function of the L2/L3 switch transmits the frames to both the Eth(WK) and the Eth(PT) of the MSPP device. It is shown in FIG. 1 that the L2/L3 switch transmits a frame a to the Eth(WK) and a frame b to the Eth(PT).

The following problems can arise in such a scenario.

(1) The L2/L3 switch cannot distinguish which of the ports Eth(WK) and Eth(PT) is ACT and which is in STBY (standby) mode. Therefore, when the L2/L3 switch transmits the frames to both Eth(WK) and Eth(PT), the frame a received by the ACT port Eth(WK) of MPSS device is transmitted to the WAN. However, the frame b received by the STBY port Eth(PT) is not forwarded to the WAN and is thus lost.

(2) Even though the L2/L3 switch transmits the frames a and b using both Eth(WK) and Eth(PT), the frame b received by the MSPP device via the Eth(PT) is discarded without being passed on the OCn due to transmission channel not being established between the Eth(PT) and the E/O of the OCn.

(3) The STS TSI function of the MSPP device can be used to switch the modes of the transmission channels from ACT to STBY and vice versa and thus can be used to switch the Eth(WK) to ACT. However, there is no way of linking this switching control between ACT mode and STBY mode to the L2/L3 switch. Like the problem in point (1), this is due to a lack of a function that links ACT/STBY control for the ports of Eth(WK) and Eth(PT) with the L2/L3 switch.

The present invention purports to solve the problems described in points (1) to (3) by clearly determining ACT/STBY modes and linking the L2/L3 switch to this determination, thus preventing loss of frames received by the MSPP device from the L2/L3 switch.

Figure 2:
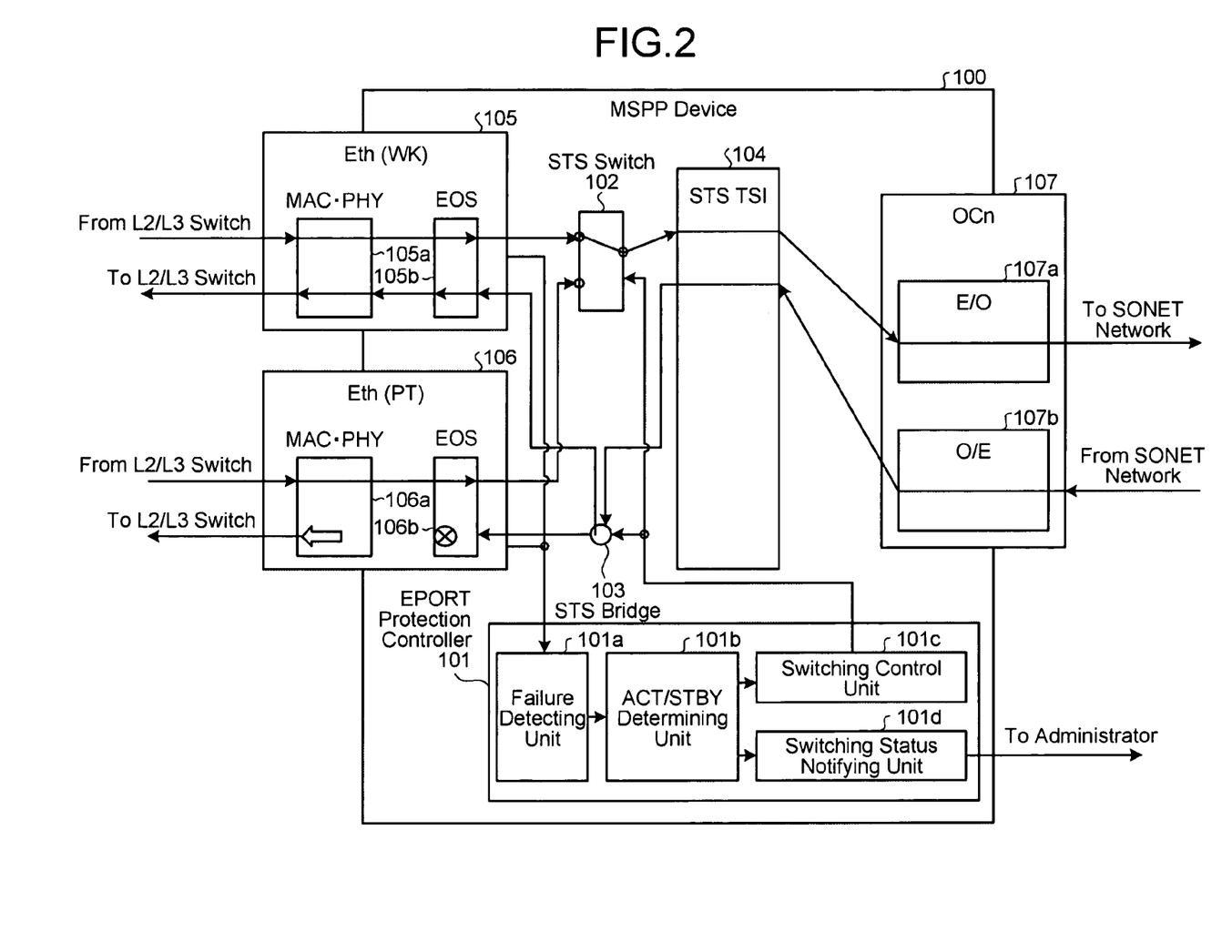
FIG. 2 is a block diagram of the MSPP device according to a first embodiment of the present invention.

FIGS. 2 to 6 are drawings related to the first embodiment of the present invention. FIG. 2 is a block diagram of the MSPP device according to the first embodiment. An MSPP device 100 includes an EPORT protection controller 101, an STS switch 102, an STS bridge 103, and an STS TSI 104, an Eth(WK) 105, an Eth(PT) 106, and an OCn 107.

The EPORT protection controller 101 is a controller to perform "1+1 switching control" and includes a failure detecting unit 101a, an ACT/STBY determining unit 101b, a switching control unit 101c, and a switching-status notifying unit 101d.

The failure detecting unit 101a monitors the connection status of the lines connected to the Eth(WK) 105 and the Eth(PT) 106, the link-up (link established) status/link-down (delinked) status of the Eth(WK) 105 and the Eth(PT) 106, failure data pertaining to failure of the Eth(WK) 105 and the Eth(PT) 106, and a frame reception status from the L2/L3 switch.

The ACT/STBY determining unit 101b identifies the Eth(WK) 105 and the Eth(PT) 106 as ACT/STBY mode based on the failure data detected by the failure detecting unit 101a, identifying the communication line without failure as ACT. If both the Eth(WK) 105 and the Eth(PT) 106 are working without failure, the ACT/STBY determining unit 101b identifies the Eth(WK) 105 and the Eth(PT) 106 as ACT/STBY based on the frame reception status, identifying the port that is receiving frames as ACT. If both the Eth(WK) 105 and the Eth(PT) 106 are receiving the frames, the ACT/STBY determining unit 101b continues identifying the ACT/STBY status of the Eth(WK) 105 and the Eth(PT) 106 based on the prevailing conditions. When the MSPP device 100 is initially connected to the L2/L3 switch, the ACT/STBY determining unit 101b identifies the Eth(WK) 105 as ACT.

The switching control unit 101c switches the STS switch 102 to the Eth(WK) 105 or the Eth(PT) 106 that has just been switched to ACT. An Ethernet-over-SONET (EOS) control function suspends communication between the Eth(PT) 106 or the Eth(WK) 105 that has just been switched to STBY and the L2/L3 switch to which it is connected. The EOS control refers to control exerted over the Eth(WK) 105 and the Eth(PT) 106 to start/suspend communication between the MSPP device 100 and the L2/L3 switch to which the MSPP device 100 is connected.

Figure 3:
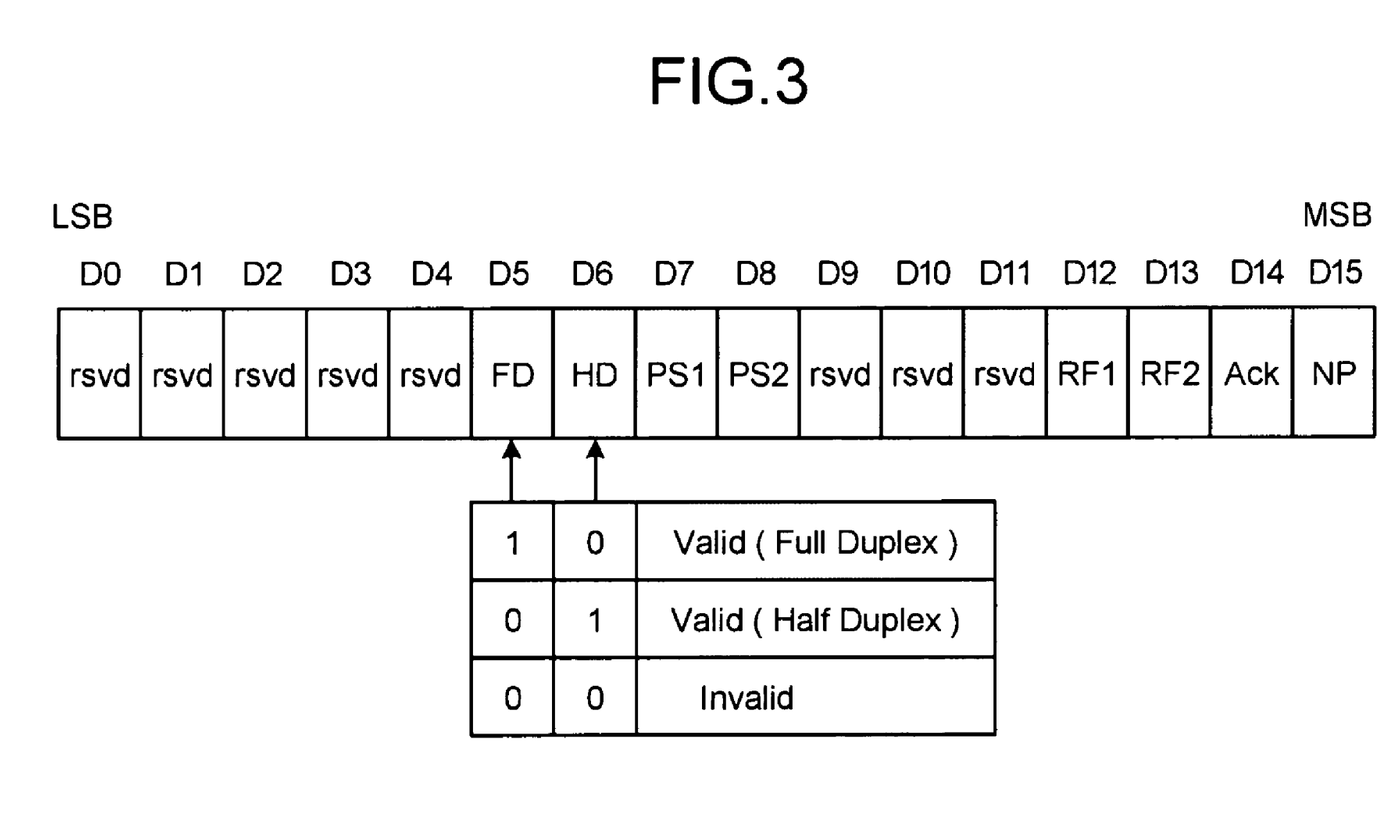
FIG. 3 is a drawing of a format of negotiation data the MPSS device transmits to the L2/L3 switch.

An invalid negotiation data from the Eth(PT) 106 or the Eth(WK) 105 that has just been switched to STBY is transmitted to the L2/L3 switch to which the Eth(PT) 106 or the Eth(WK) 105 is connected. Negotiation data refers to the data that the MSPP device 100 transmits to the L2/L3 switch in a format shown in FIG. 3. FIG. 3 is a drawing of the format of the negotiation data the MPSS device 100 transmits to the L2/L3 switch. In an invalid negotiation data, as shown in FIG. 3, the bits of FD of D5 and HD of D6 are zero. Upon receiving the invalid negotiation data, the L2/L3 switch exerts an EOS control to suspend communication between the relevant port and the MSPP device 100 to which the port is connected. EOS control refers to control exerted over the ports of the L2/L3 switch to start/suspend communication between the ports and the MSPP device 100 to which the ports are connected.

Then, a valid negotiation data from the Eth(WK) 105 or the Eth(PT) 106 that has just been switched to ACT is transmitted to the L2/L3 switch connected to the Eth(WK) 105 or the Eth(PT) 106. As shown in FIG. 3, in the valid negotiation data, the bits of FD of D5 AND HD of D6 are 1 and 0, respectively (full duplex) or 0 and 1, respectively (half duplex). Upon receiving the valid negotiation data, the L2/L3 switch exerts the EOS control to start communication with the MSPP device 100 to which the L2/L3 switch is connected. At the same time, the EOS control over the Eth(WK) 105 or the Eth(PT) 106 that has just been switched to ACT exerts to start communication with the L2/L3 switch to which the Eth(WK) 105 or the Eth(PT) 106 is connected.

The switching-status notifying unit 101d notifies the switching result of the STS switch 102 and the STS bridge 103 to an external managing device, which displays the switching result, enabling an MSPP device administrator to know the switching result of the STS switch 102 and the STS bridge 103 in the MSPP device 100. When the failure detecting unit 101a determines that the Eth(WK) 105 and the Eth (PT) 106 have received frames from the L2/L3 switch, the switching-status notifying unit 101d notifies this fact to the external managing device, which displays the notification, enabling the MSPP device administrator to learn that frame reception failure has occurred in the MSPP device 100.

The STS switch 102 switches the line via which the frame from the L2/L3 switch is passed on to the STS switch 102, switching between the Eth(WK) 105 and the Eth(PT) 106. The STS bridge 103 switches the line via which the frame from the OCn 107 is passed on to the L2/L3 switch, switching between the Eth(WK) 105 and the Eth(PT) 106.

The STS TSI 104 performs time division multiplexing on the frames exchanged between the SONET network and the L2/L3 switch.

The Eth(WK) 105 is an Ethernet (registered trademark) interface unit which is provided in the MSPP device 100 to enable connection between the L2/L3 switch and the MSPP device 100. The Eth(WK) 105 includes a physical port (MAC PHY) 105a and an EOS 105b that performs the EOS control. The EOS control by the EOS 105b suspends transmission of the frames from the Eth(WK) 105 to the L2/L3 switch. Similarly, the Eth(PT) 106 includes a physical port (MAC PHY) 106a and an EOS 106b that performs the EOS control. Both the EOS 105b and the EOS 106b are mounted on a single-chip integrated circuit.

The OCn 107 is an interface provided in the MSPP device 100 to enable connection between the SONET network and the MSPP device 100, and includes an E/O 107a that serves as an interface for transmitting frames from the MSPP device 100 to the SONET network, and an O/E 107b that serves as an interface for transmitting frames from the SONET network to the MSPP device 100.

Figure 4:
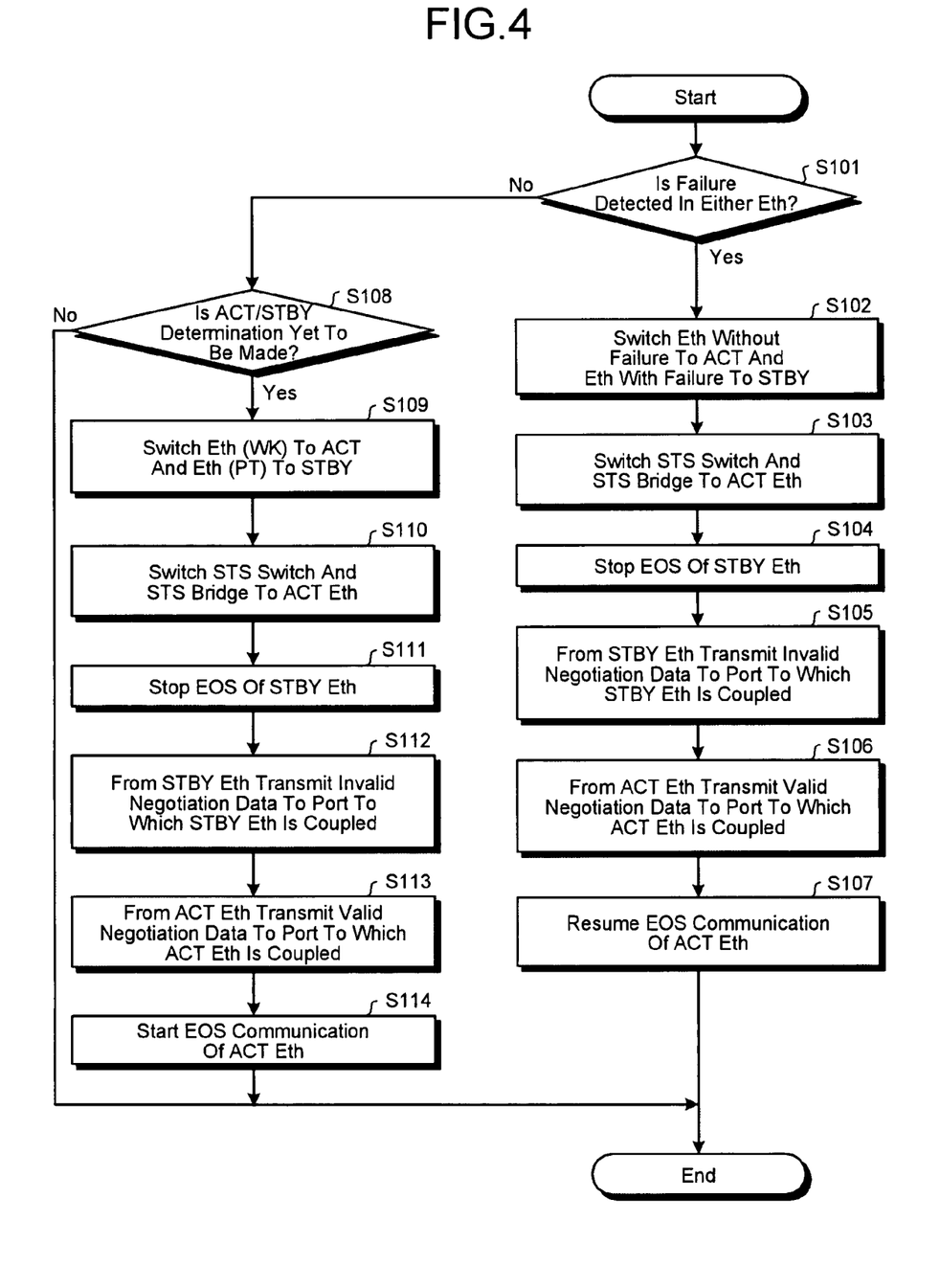
FIG. 4 is a flowchart of an ACT/STBY determination/1+1 switching process according to the first embodiment.

An ACT/STBY determination/1+1 switching process performed by the MSPP device 100 according to the first embodiment shown in FIG. 2 is described below. FIG. 4 is a flowchart of the ACT/STBY determination/1+1 switching process according to the first embodiment. First, the failure detecting unit 101a checks whether failure has occurred in the Eth(WK) 105 or the Eth(PT) 106 (step S101). If failure is detected in either the Eth(WK) 105 or the Eth(PT) 106 (Yes at step S101), the process proceeds to Step S102. Otherwise (No at step S101), the process proceeds to step S108.

At step S102, the ACT/STBY determining unit 101b switches the Eth(WK) 105 or the Eth(PT) 106 in which failure is not detected to ACT, and the Eth(WK) 105 or the Eth(PT) 106 in which failure is detected to STBY. The switching control unit 101c switches the STS switch 102 and the STS bridge 103 to the Eth(WK) 105 or the Eth(PT) 106 that has been switched to ACT (step S103).

The switching control unit 101c suspends the EOS (EOS communication) of the Eth(WK) 105 or the Eth(PT) 106 that has been switched to STBY (step S104). The Eth(WK) 105 or the Eth(PT) 106 that has been switched to STBY transmits an invalid negotiation data to the port of the L2/L3 switch to which it is connected (step S105). The Eth(WK) 105 or the Eth(PT) 106 that has been switched to ACT transmits a valid negotiation data to the port of the L2/L3 switch to which it is connected (step S106). The switching control unit 101c resumes the EOS communication of the Eth(WK) 105 or the Eth(PT) 106 that has been switched to ACT (step S107).

At step S108, the ACT/STBY determining unit 101b checks whether ACT/STBY determination is yet to be made. If ACT/STBY determination is yet to be made (Yes at step S108), the process proceeds to step S109. Otherwise (No at step S108), the ACT/STBY determination/1+1 switching process is terminated.

At step S109, the ACT/STBY determining unit 101b switches the Eth(WK) 105 to ACT and the Eth(PT) 106 to STBY. The switching control unit 101c switches the STS switch 102 and the STS bridge 103 to the Eth(WK) 105 (step S110).

The switching control unit 101c then suspends the EOS (EOS communication) of the Eth(PT) 106 (step S111). The Eth(PT) 106 transmits an invalid negotiation data to the port of the L2/L3 switch to which it is connected (step S112). The Eth(WK) 105 transmits a valid negotiation data to the port of the L2/L3 switch (step S113) to which it is connected. The switching control unit 101c starts EOS communication of the Eth(WK) 105 (step S114).

Figure 5:
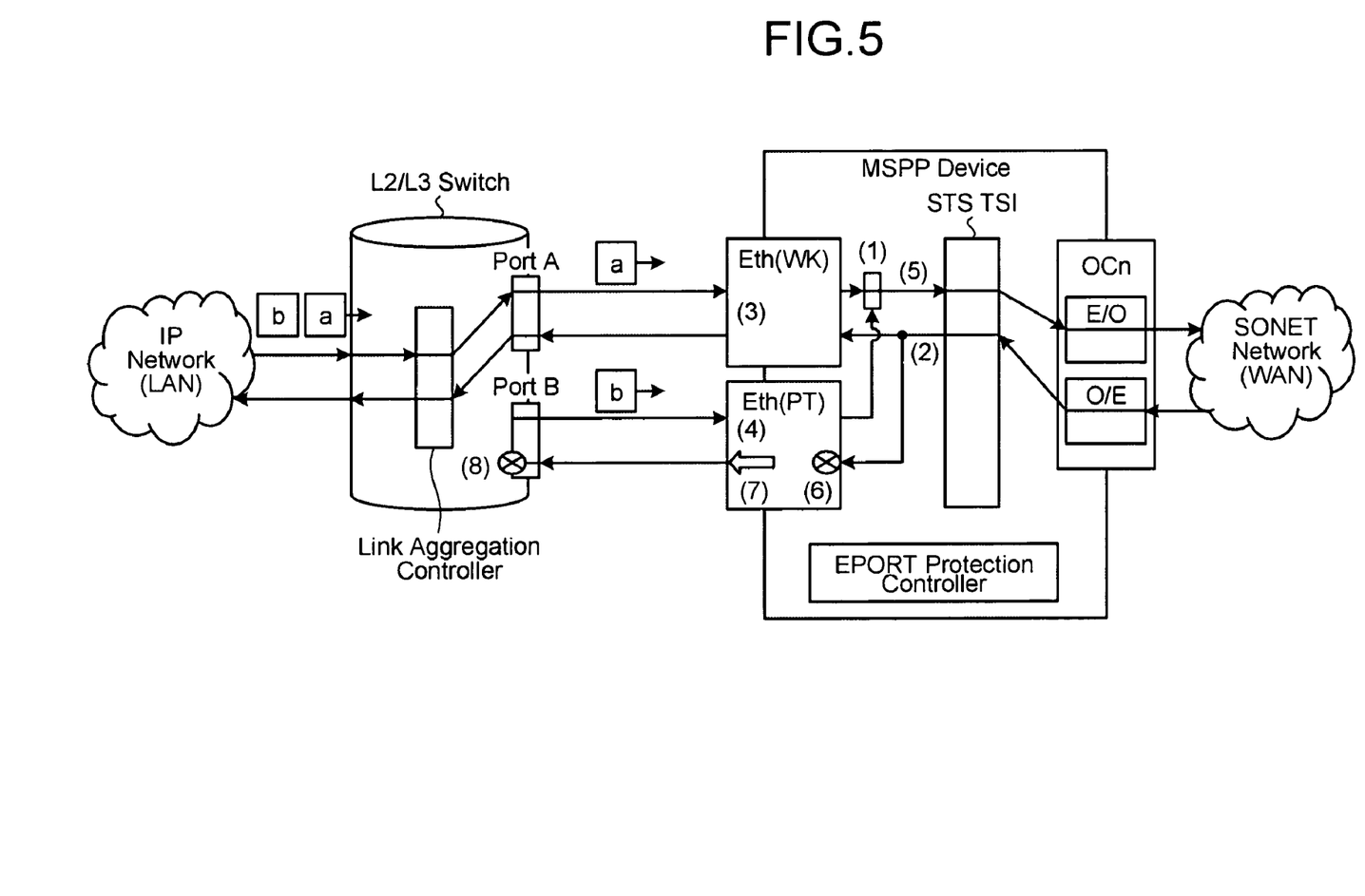
FIG. 5 is a schematic for explaining the ACT/STBY determination/1+1 switching process when there is no failure detected.

The ACT/STBY determination process according to the first embodiment when there is no failure detected is described below. FIG. 5 is a schematic for explaining the ACT/STBY determination process of the ACT/STBY determination/1+1 switching process according to the first embodiment shown in FIG. 4 when there is no failure detected (corresponding to No at step S101, Yes at step S108, and steps S109 to 114). In the description it is supposed that the MSPP device 100 and the L2/L3 switch are connected to each other and mediate the exchange of frames between the SONET network (WAN) and an Internet protocol (IP) network (LAN). It is also supposed that the Eth(WK) 105 is ACT, and the Eth(PT) 106 is STBY.

(1) The STS switch 102 switches to the Eth(WK) 105 so that the frames being transmitted through the Eth(WK) 105 can be received. (2) The STS bridge 103 also switches to the Eth(WK) 105 so that the frames being transmitted from the SONET network (WAN) can only be passed on to the Eth (WK) 105. (3) The frame a from a port A of the L2/L3 switch arrives at the Eth(WK) 105. (4) The frame b from a port B of the L2/L3 switch arrives at the Eth(PT) 106. (5) Due to the switching of the STS switch 102, the frame a is passed on to the STS TSI 104 but the frame b is not.

(6) Due to the switching of the STS bridge 103, the frames from the SONET network (WAN) are not passed on to the Eth(PT) 106 and are only passed on to the Eth(WK) 105. (7) The Eth(PT) 106 transmits an invalid negotiation data to the port B of the L2/L3 switch, according to the process at step S112 shown in FIG. 4. (8) In response to the invalid negotiation data received at the port B of the L2/L3 switch, the EOS built into the port B is stopped by the EOS control, disabling the port B from transmitting or receiving frames.

Thus, the L2/L3 switch, which conventionally transmits the frames to the MSPP device 100 by the link aggregation function without discriminating between the ports A and B, now uses only the port A to transmit and receive the frames, blocking the port B. Thus, the frames received from the port B of the IP network (LAN) being discarded at the MSPP device side can be prevented. To achieve this, the L2/L3 switch needs to be equipped with the normal link aggregation function as well as a delinking function to delink the port receiving the invalid negotiation data.

Figure 6:
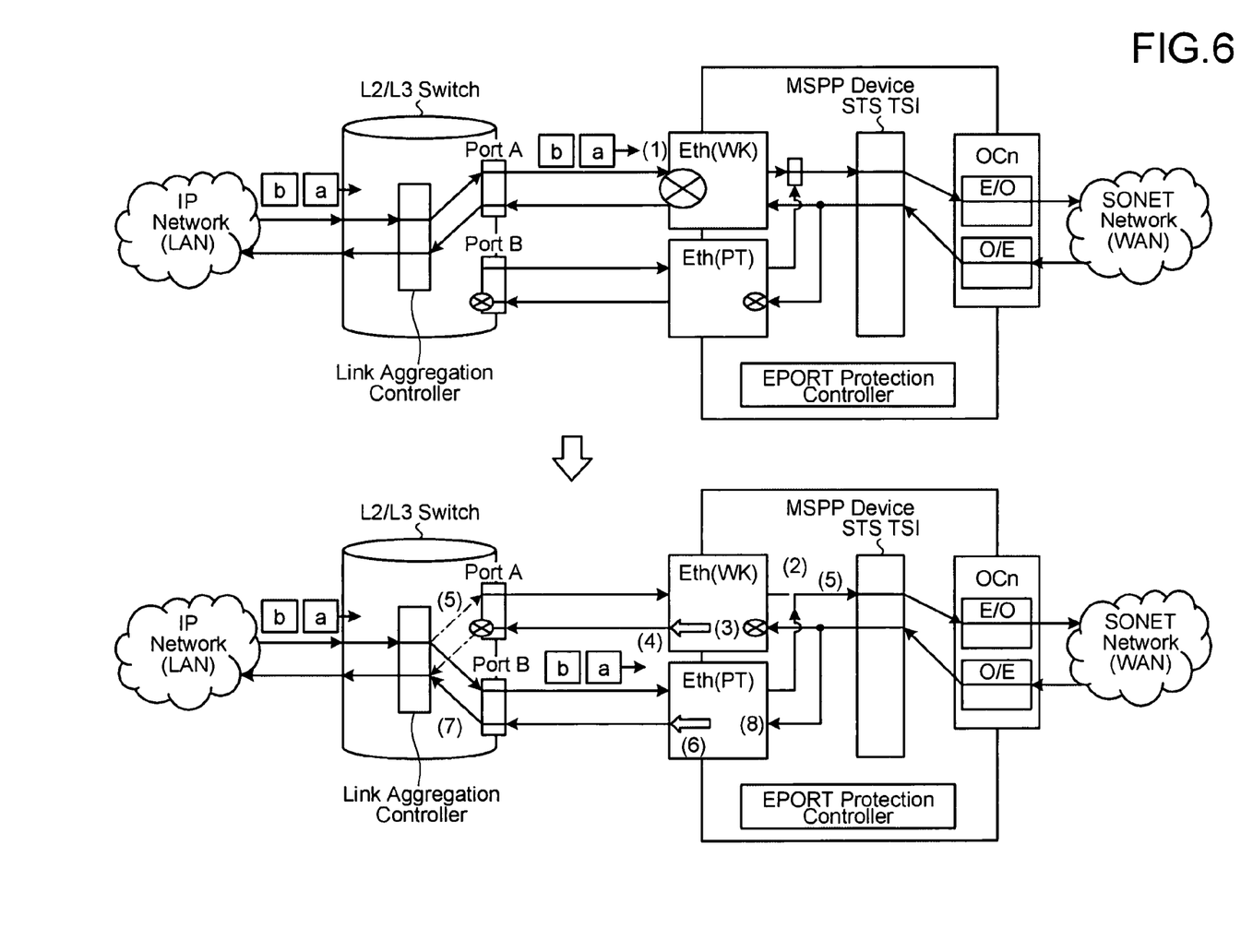
FIG. 6 is a schematic for explaining the ACT/STBY determination process when failure is detected.

The 1+1 switching process according to the first embodiment when failure is detected is described below. FIG. 6 is a schematic for explaining the 1+1 switching process of the ACT/STBY determination/1+1 switching process according to the first embodiment shown in FIG. 4 when failure is detected (corresponding to Yes at step S101, and steps S102 to 107). In this description also it is supposed that the MSPP device 100 and the L2/L3 switch are connected to each other and mediate the exchange of frames between the SONET network (WAN) and the IP network (LAN). It is also supposed that prior to occurrence of failure, the Eth(WK) 105 is ACT, and the Eth(PT) 106 is STBY.

(1) Due to failure of the Eth(WK) 105, the frames a and b that have arrived at the Eth(WK) 105 from the port A of the L2/L3 switch are unable to be received. (2) The EPORT protection controller 101 that detected the failure exerts control over the STS switch 102 to switch to the Eth(PT) 106 so that the frames being transmitted through the Eth(PT) 106 can be received. (3) The STS bridge 103 also switches to the Eth(PT) 106 so that the frames being transmitted from the SONET network (WAN) can only be passed on to the Eth(PT) 106. (4) In response to the switching by the STS switch 102 and the STS bridge 103, the Eth(WK) 105 transmits an invalid negotiation data to the port A of the L2/L3 switch.

(5) In response to the invalid negotiation data received at the port A of the L2/L3 switch, the EOS built into the port A is stopped by the EOS control, disabling the port A from transmitting or receiving frames.

Due to the switching of the STS bridge 103, the frames from the SONET network (WAN) are not passed on to the Eth(WK) 105 and are only passed on to the Eth(PT) 106. (6) In response, the Eth(PT) 106 transmits a valid negotiation data to the port B of the L2/L3 switch. (7) In response to the valid negotiation data received at the port B of the L2/L3 switch, communication of the EOS built into the port B is started by the EOS control, enabling the port B to transmit or receive frames. (8) EOS communication of the Eth(PT) 106 is resumed.

Thus, the L2/L3 switch blocks the use of the port A connected to the Eth(WK) 105 in which failure has occurred, using only the port B to transmit and receive frames. Thus, frames received from the port A of the IP network (LAN) being discarded at the MSPP device end can be prevented.

Figure 7:
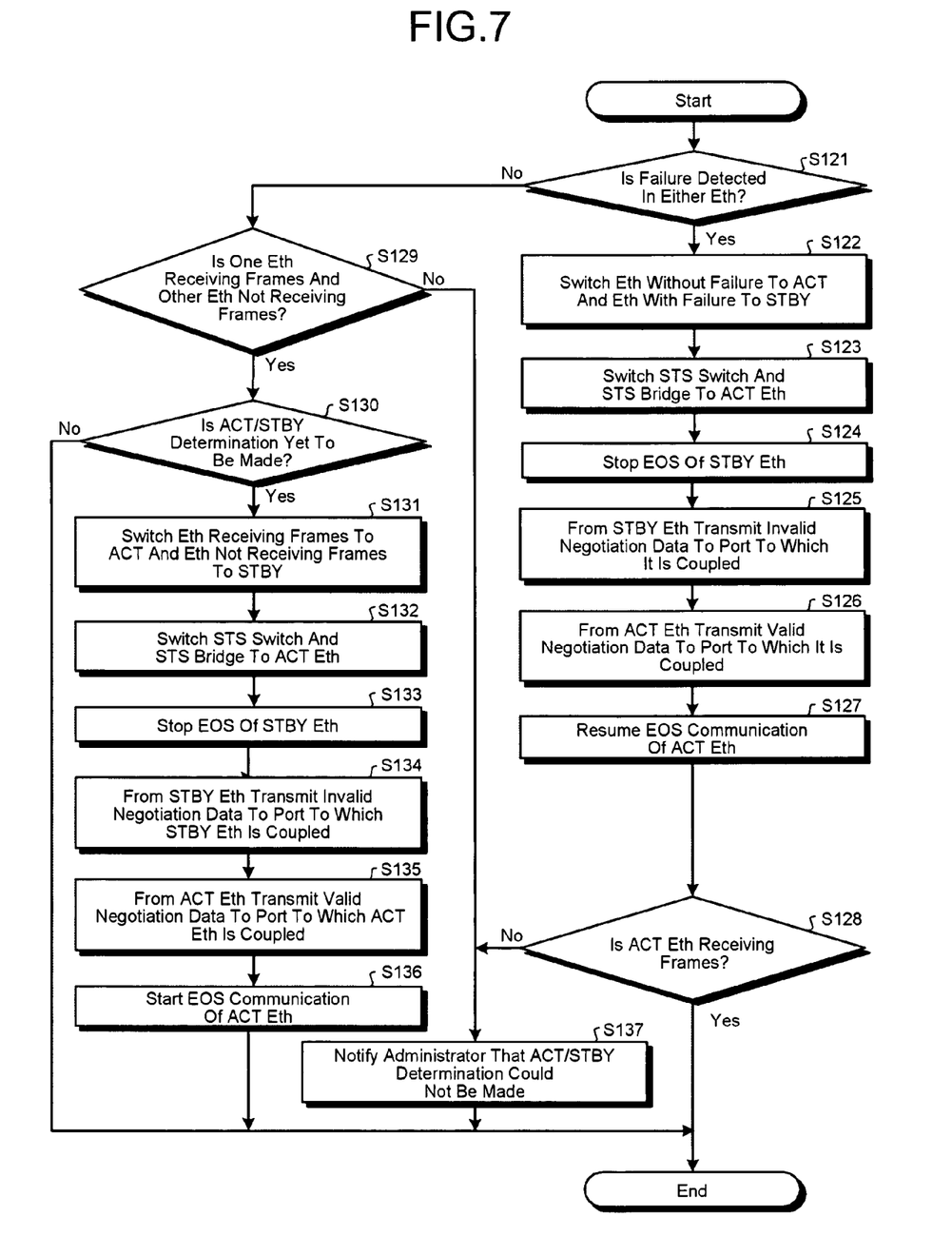
FIG. 7 is a flowchart of an ACT/STBY determination/1+1 switching process according to a second embodiment of the present invention taking place by the L2/L3 switch equipped with the link aggregation function with a selection function and the MPSS device connected to the L2/L3 switch.
Figure 8:
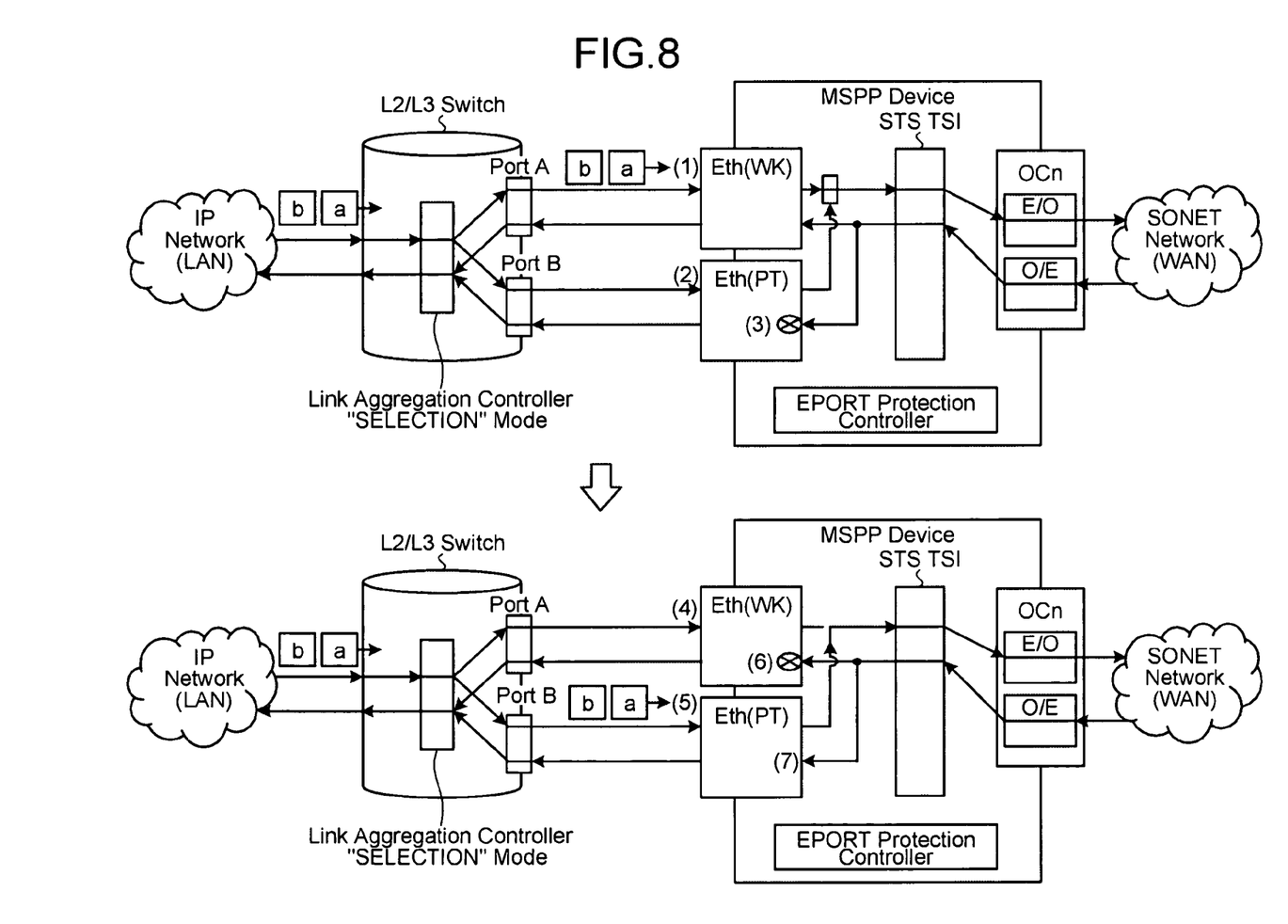
FIG. 8 is a schematic for explaining an ACT/STBY determination process by the L2/L3 switch equipped with the link aggregation function with a selection function.
Figure 9:
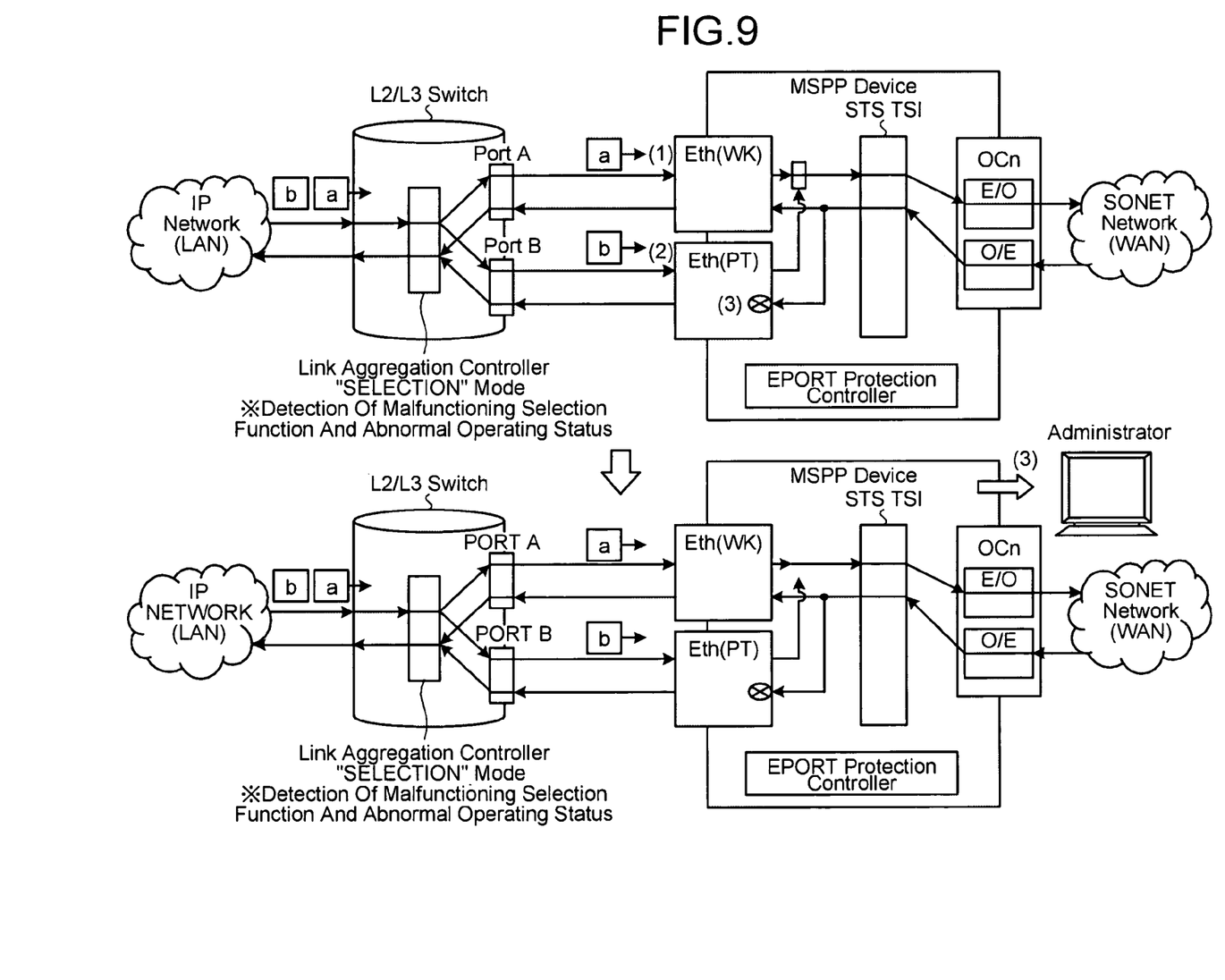
FIG. 9 is a schematic for explaining a process by the L2/L3 switch equipped with the link aggregation function with a selection function when ACT/STBY is not determinable.

A second embodiment of the present invention is described below with reference to FIGS. 7 to 9. It is supposed in the second embodiment that the L2/L3 switch connected to the MSPP device 100 is equipped with the link aggregation function with a selection function. Selection function refers to a function that enables selection of a line from among a plurality of physical lines bundled together as a single logical line for transmitting frames.

The MSPP device according to the second embodiment has the same configuration as the MSPP device according to the first embodiment. An ACT/STBY determination/1+1 switching process of the MSPP device 100 according to the second embodiment is described below. FIG. 7 is a flowchart of the ACT/STBY determination/1+1 switching process according to the second embodiment. First, the failure detecting unit 101a checks whether failure has occurred in the Eth(WK) 105 or the Eth(PT) 106 (step S121). If failure is detected in either the Eth(WK) 105 or the Eth(PT) 106 (Yes at step S101), the process proceeds to Step S102. Otherwise (No at step S121), the process proceeds to step S129.

At step S122, the ACT/STBY determining unit 101b switches the Eth(WK) 105 or the Eth(PT) 106 in which failure is not detected to ACT, and the Eth(WK) 105 or the Eth(PT) 106 in which failure is detected to STBY. The switching control unit 101c switches the STS switch 102 and the STS bridge 103 to the Eth(WK) 105 or the Eth(PT) 106 that has been switched to ACT (step S123).

The switching control unit 101c suspends the EOS (EOS communication) of the Eth(WK) 105 or the Eth(PT) 106 that has been switched to STBY (step S124). The Eth(WK) 105 or the Eth(PT) 106 that has been switched to STBY transmits an invalid negotiation data to the port of the L2/L3 switch to which it is connected (step S125). The Eth(WK) 105 or the Eth(PT) 106 that has been switched to ACT transmits a valid negotiation data to the port of the L2/L3 switch to which it is connected (step S126). The EOS communication of the Eth (WK) 105 or the Eth(PT) 106 that has been switched to ACT (step S127) is resumed.

The failure detecting unit 101a checks whether the frame is properly received at the Eth(WK) 105 or the Eth(PT) 106 that is ACT (step S128). If the frame is properly received (Yes at step S128), the ACT/STBY determination/1+1 switching process is terminated. If the frame is not properly received (No at step S128), the process proceeds to step S137.

At step S129, the failure detecting unit 101a checks whether of the Eth(WK) 105 and the Eth(PT) 106, one is receiving the frames properly and the other is not. If of the Eth(WK) 105 and the Eth(PT) 106, one is receiving the frames properly and the other is not (Yes at step S129), the process proceeds to S130, otherwise (No at step S129), the process proceeds to step S137.

At step S130, the ACT/STBY determining unit 101b checks whether ACT/STBY determination is yet to be made. If ACT/STBY determination is yet to be made (Yes at step S130), the process proceeds to step S131. Otherwise (No at step S130), the ACT/STBY determination/1+1 switching process is terminated.

At step S131, the ACT/STBY determining unit 101b switches either Eth(WK) 105 or the Eth(PT) 106, whichever is receiving the frames to ACT, switching the other to STBY. The switching control unit 101c switches the STS switch 102 and the STS bridge 103 to the Eth(WK) 105 or the Eth(PT) 106, whichever is switched to ACT (step S132). The switching control unit 101c then suspends the EOS (EOS communication) of the Eth(WK) 105 or the Eth(PT) 106, whichever is switched to STBY (step S133).

Of the Eth(WK) 105 and the Eth(PT) 106, the one that has been switched to STBY transmits an invalid negotiation data to the port of the L2/L3 switch to which it is connected (step S134), while the other that has been switched to ACT transmits a valid negotiation data to the port of the L2/L3 switch (step S135) to which it is connected. The EOS communication of the Eth(WK) 105 or the Eth(PT) 106 that has been switched to ACT (step S136) is started.

At step S137, the switching-status notifying unit 101d notifies the administrator that ACT/STBY determination could not be made.

The ACT/STBY determination process in the case when the L2/L3 switch according to the second embodiment is equipped with the link aggregation function with the selection function is described below. FIG. 8 is a schematic for explaining the ACT/STBY determination process (corresponding to No at step S121, Yes at step S129, Yes at step S130, and steps 131 to 136) of the ACT/STBY determination/1+1 switching process. In the description it is supposed that the MSPP device 100 and the L2/L3 switch are connected to each other and mediate the exchange of frames between the SONET network (WAN) and the IP network (LAN). It is also supposed that the Eth(WK) 105 is ACT, and the Eth(PT) 106 is STBY. Further, it is supposed that the L2/L3 switch selects only the port A to transmit the frames to the MSPP device 100.

(1) The frames a and b from the port A of the L2/L3 switch arrive at the Eth(WK) 105. (2) No frames arrive from the port B of the L2/L3 switch at the Eth(PT) 106. (3) Upon arrival of the frames a and b, the EPORT protection controller 101 exerts control over the STS switch 102 to switch to Eth(WK) 105 so that the frames being transmitted through the Eth(WK) 105 can be received, and the STS bridge 103 switches to the Eth(WK) 105 so that the frames being transmitted from the SONET network (WAN) can only be passed on to the Eth (WK) 105. In response to the switching by the STS switch 102 and the STS bridge 103, the Eth(PT) 106 transmits an invalid negotiation data to the port B of the L2/L3 switch.

In response to the invalid negotiation data received at the port B of the L2/L3 switch, the EOS built into the port B is stopped by the EOS control, disabling the port B from transmitting or receiving frames. Meanwhile, due to the switching of the STS bridge 103, the frames from the SONET network (WAN) are not passed on to the Eth(WK) 105 and are only passed on to the Eth(PT) 106. In response, the Eth(WK) 105 transmits a valid negotiation data to the port A of the L2/L3 switch. In response to the valid negotiation data received at the port A of the L2/L3 switch, communication of the EOS built into the port A is started by the EOS control, enabling the port A to transmit or receive frames.

(4) Due to failure in the Eth(WK) 105, the frames a and b that have arrived at the Eth(WK) 105 from the port A of the L2/L3 switch are unable to be received. (5) Following the failure of the Eth(WK) 105, the frames a and b are rerouted to arrive at the Eth(PT) 106 from the port B of the L2/L3 switch. (6) The EPORT protection controller 101 that detected the failure exerts control over the STS switch 102 to switch to Eth(PT) 106 so that the frames being transmitted through the Eth(PT) 106 can be received. (7) The STS bridge 103 also switches to the Eth(PT) 106 so that the frames being transmitted from the SONET network (WAN) can only be passed on to the Eth(PT) 106. In response to the switching by the STS switch 102 and the STS bridge 103, the Eth(WK) 105 transmits an invalid negotiation data to the port A of the L2/L3 switch.

In response to the invalid negotiation data received at the port A of the L2/L3 switch, the EOS built into the port A is stopped by the EOS control, disabling the port A from transmitting or receiving frames.

Due to the switching of the STS bridge 103, the frames from the SONET network (WAN) are not passed on to the Eth(WK) 105 and are only passed on to the Eth(PT) 106. In response, the Eth(PT) 106 transmits a valid negotiation data to the port B of the L2/L3 switch. In response to the valid negotiation data received at the port B of the L2/L3 switch, communication of the EOS built into the port B is started by the EOS control, enabling the port B to transmit or receive frames.

Thus even if the L2/L3 switch is equipped with the selection function, the port A connected to the Eth(WK) 105 in which failure occurred can be blocked, using only the port B, according to change in the selection (change in the selected line). Thus, frames received from the port A of the IP network (LAN) being discarded at the MSPP device end can be prevented.

In the description given above, the L2/L3 switch equipped with the selection function detects failure in the Eth(WK) 105 or the Eth(PT) 106 of the MSPP device 100, and independently changes the selection. However, the L2/L3 switch can be configured to change the selection regardless of failure occurrence.

The process when the L2/L3 switch according to the second embodiment equipped with the link aggregation function with the selection function is unable to determine the ACT/STBY status is explained below. FIG. 9 is a schematic for explaining the process, in the ACT/STBY determination/1+1 switching process according to the second embodiment shown in FIG. 7, when the L2/L3 switch equipped with the link aggregation function with the selection function is unable to determine the ACT/STBY status (step S137 (corresponding to No at step S128 and No at step S129)). In the description also it is supposed that the MSPP device 100 and the L2/L3 switch are connected to each other and mediate the exchange of frames between the SONET network (WAN) and the IP network (LAN). It is also supposed that the Eth(WK) 105 is ACT, and the Eth(PT) 106 is STBY.

(1) The Eth(WK) 105 of the MSPP device 100 receives the frame a from the port A. (2) The Eth(PT) 106 of the MSPP device 100 receives the frame b from the port B. (3) The STS switch 102 and the STS bridge 103 are both switched to Eth(WK) 105, disabling Eth(PT) 106 from transmitting or receiving frames.

Regardless of the switching state of the STS switch 102 and the STS bridge 103, the frame a is received by the Eth(WK) 105 and the frame b is received by the Eth(PT) 106. Therefore, the failure detecting unit 101a of the MSPP device 100 detects malfunctioning of the selection function of the L2/L3 switch and abnormal operating status. The switching-status notifying unit 101d notifies the abnormal operating status to the administrator's terminal device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. The effects due to the embodiments are not thus limited.

All the automatic processes explained in the embodiments can be, entirely or in part, carried out manually. Similarly, all the manual processes explained in the present embodiment can be, entirely or in part, carried out automatically by a known method.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process functions performed by the device can be entirely or partially realized by a central processing unit (CPU) or a computer program executed by the CPU or by a hardware using wired logic.

All the automatic processes explained in the first to third embodiments can be, entirely or in part, carried out manually. Similarly, all the manual processes explained in the embodiments can be, entirely or in part, carried out automatically by a known method. The process procedures, the control procedures, specific names, and data, including various parameters mentioned in the description and drawings can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process functions performed by the device can be entirely or partially realized by the CPU (or micro processing unit (MPU) or micro controller unit (MCU) or a computer program executed by the CPU (or MPU or MCU) or by a hardware using wired logic.

According to an embodiment of the present invention, notification is transmitted to an interface device on the side of the local area network (LAN) via all the ports rendered as standby ports by selection of an active port by an active port selecting unit indicating that lines connected to the standby ports are in a standby mode. Consequently, the interface device on the side of the LAN can recognize the standby ports.

According to an embodiment of the present invention, the active port selecting unit selects the port that is receiving frames properly as the active port. Consequently, the interface device on the side of the LAN can recognize the port that is receiving the frames properly as the active port.

According to an embodiment of the present invention, transceiving channels are switched to enable transmission and reception of frames between the LAN and a wide area network (WAN) via the active port selected by the active-port selecting unit, and notification is transmitted to the interface device on the side of the local area network (LAN) via all the ports rendered as standby ports by selection of the active port by the active port selecting unit indicating that lines connected to the standby ports are in a standby mode. Consequently, line selection can be made by linking the transceiving-channel switching unit and the interface device on the side of the LAN.

According to an embodiment of the present invention, the switching status of the transceiving channels can be made available to an administrator of a network apparatus.

According to an embodiment of the present invention, an abnormal status arising from reception of frames at all the ports can be made available to the administrator of the network device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network apparatus for a wide area network (WAN) connected to an interface device for a local area network (LAN) via a plurality of lines, comprising:
   a plurality of ports that are connectable to the WAN;
   a monitoring unit that monitors reception of frames to determine whether the frames are received through the plurality of ports from the interface device for the LAN;
   a port connecting unit that connects to the WAN a port in the plurality of ports;
   an active-port selecting unit that selects as an active port the port connected to the WAN by the port connecting unit, when the monitoring unit determines that the frames are received through the plurality of ports from the interface device for the LAN; and
   a notifying unit that notifies the interface device that a line connected to a port other than the active port selected is in a standby mode, and that a line connected to the active port is in an active mode.

2. The network apparatus according to claim 1, wherein the monitoring unit determines a port properly receiving the frames from the WAN, and
   the active-port selecting unit selects as the active port the port determined by the monitoring unit.

3. The network apparatus according to claim 1, further comprising a transceiving-channel switching unit that switches between transceiving channels so as to transmit and receive the frames between the LAN and the WAN via the active port selected by the active-port selecting unit.

4. The network apparatus according to claim 3, further comprising a switching-status notifying unit that notifies an external device of a switching status of the transceiving channels by the transceiving-channel switching unit.

5. The network apparatus according to claim 1, further comprising:
   a warning unit that issues to an external device a warning indicating that the active-port selecting unit is unable to select an active port, when the monitoring unit determines that the plurality of ports receive the frames from the interface device.

6. A redundant network method for connecting a local area network (LAN) and a wide area network (WAN) through a plurality of ports, the method comprising:
   monitoring reception of frames to determine whether the frames are received through the plurality of ports from an interface device for the LAN;
   connecting to the WAN a port in the plurality of ports;
   selecting as an active port the port connected to the WAN at the connecting, when the determining determines that the frames are received through the plurality of ports from the interface device for the LAN; and
   notifying the interface device that a line connected to a port other than the active port selected is in a standby mode, and that a line connected to the active port is in an active mode.

7. The redundant network method according to claim 6, wherein the determining includes determining a port properly receiving the frames from the WAN, and the port determined is selected as the active port.

8. The redundant network method according to claim 6, further comprising switching between transceiving channels to transmit and receive the frames between the LAN and the WAN via the active port.

9. A non-transitory computer-readable recording medium that stores therein a computer program for connecting a controller of an interface device for a wide area network (WAN) to a local area network (LAN) through a plurality of ports of the interface device, the computer program causing the controller of the interface device to execute a process comprising:
   monitoring reception of frames to determine whether the frames are received through the plurality of ports from an interface device for the LAN;
   connecting to the WAN a port in the plurality of ports;
   selecting as an active port the port connected to the WAN at the connecting, when the determining determines that the frames are received through the plurality of ports from the interface device for the LAN; and
   notifying the interface device that a line connected to a port other than the active port selected is in a standby mode, and that a line connected to the active port is in an active mode.

10. The non-transitory computer-readable recording medium according to claim 9, wherein the computer program further causes the controller to execute determining a port properly receiving the frames from the WAN, and the port determined is selected as the active port.

11. The non-transitory computer-readable recording medium according to claim 9, wherein the computer program further causes the controller to execute switching between transceiving channels to transmit and receive the frames between the LAN and the WAN via the active port.

* * * * *